United States Patent
Zhao et al.

(10) Patent No.: US 10,006,808 B2
(45) Date of Patent: Jun. 26, 2018

(54) ADJUSTING GAIN OF DETECTOR

(71) Applicant: SHENYANG NEUSOFT MEDICAL SYSTEMS CO., LTD., Shenyang (CN)

(72) Inventors: Jian Zhao, Shenyang (CN); Nan Li, Shenyang (CN); Guocheng Wu, Shenyang (CN); Baowei Xu, Shenyang (CN); Changqing Fu, Shenyang (CN); Guodong Liang, Shenyang (CN)

(73) Assignee: Shenyang Neusoft Medical Systems Co., Ltd., Shenyang (CN)

( * ) Notice: Subject to any disclaimer, the term of this patent is extended or adjusted under 35 U.S.C. 154(b) by 0 days. days.

(21) Appl. No.: 15/334,200

(22) Filed: Oct. 25, 2016

(65) Prior Publication Data

US 2017/0167915 A1 Jun. 15, 2017

(30) Foreign Application Priority Data

Dec. 11, 2015 (CN) .......................... 2015 1 0917816

(51) Int. Cl.
*G01D 18/00* (2006.01)
*G01J 1/44* (2006.01)
*H01J 43/30* (2006.01)

(52) U.S. Cl.
CPC .................. *G01J 1/44* (2013.01); *H01J 43/30* (2013.01); *G01J 2001/4406* (2013.01); *G01J 2001/4453* (2013.01)

(58) Field of Classification Search
CPC ........... H01J 43/30; G01T 1/40; G01T 1/2045
See application file for complete search history.

(56) References Cited

U.S. PATENT DOCUMENTS

| | | | | |
|---|---|---|---|---|
| 3,435,233 A | * | 3/1969 | Farnsworth | H01J 43/30 250/207 |
| 3,437,817 A | * | 4/1969 | Doonan | G01N 21/27 250/207 |
| 3,560,744 A | * | 2/1971 | Jordan | G01T 1/2045 250/252.1 |
| 3,714,441 A | * | 1/1973 | Kreda | H01J 43/30 250/207 |
| 3,721,824 A | * | 3/1973 | Bristol | G01T 1/2045 250/207 |
| 3,792,276 A | * | 2/1974 | Toman | G01T 1/204 250/369 |

(Continued)

FOREIGN PATENT DOCUMENTS

| | | |
|---|---|---|
| CN | 104570043 A | 4/2015 |
| CN | 104597474 A | 5/2015 |

(Continued)

*Primary Examiner* — Kiho Kim
(74) *Attorney, Agent, or Firm* — McCoy Russell LLP

(57) ABSTRACT

A method of adjusting a gain of a detector is provided in the present disclosure. According to an example, whether a gain of a photomultiplier tube in the detector meets a gain determination condition may be determined, where the gain determination condition may indicate that an absolute of a difference between the gain of the photomultiplier tube and a target gain is within a predetermined numerical range. When the gain of the photomultiplier tube does not meet the gain determination condition, a voltage of the photomultiplier tube may be adjusted, such that the gain of the photomultiplier tube meets the gain determination condition.

15 Claims, 5 Drawing Sheets

(56) References Cited

U.S. PATENT DOCUMENTS

| | | | | |
|---|---|---|---|---|
| 3,832,542 A | * | 8/1974 | Bartlett et al. | G01N 23/16 |
| | | | | 250/336.1 |
| 4,296,320 A | | 10/1981 | Miller | |
| 4,368,384 A | | 1/1983 | Kato et al. | |
| 4,766,543 A | | 8/1988 | Schmidt | |
| 5,367,222 A | | 11/1994 | Binkley | |
| 5,600,135 A | * | 2/1997 | Jacobson | G01T 1/40 |
| | | | | 250/261 |
| 5,677,536 A | * | 10/1997 | Vickers | G01T 1/1642 |
| | | | | 250/252.1 |
| 2002/0195554 A1 | * | 12/2002 | Staton | B82Y 35/00 |
| | | | | 250/234 |
| 2010/0065746 A1 | * | 3/2010 | Grazioso | G01T 1/1644 |
| | | | | 250/363.04 |
| 2011/0031405 A1 | * | 2/2011 | Kulik | G01T 1/40 |
| | | | | 250/362 |
| 2011/0186721 A1 | * | 8/2011 | Galford | G01V 5/101 |
| | | | | 250/252.1 |

FOREIGN PATENT DOCUMENTS

| | | | |
|---|---|---|---|
| CN | 105030263 A | 11/2015 | |
| CN | 105074500 A | 11/2015 | |
| WO | 2010047865 A1 | 4/2010 | |
| WO | 2015097448 A1 | 7/2015 | |

* cited by examiner

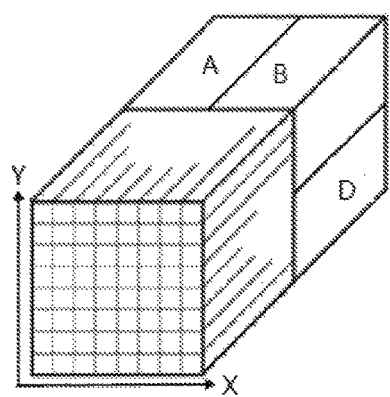
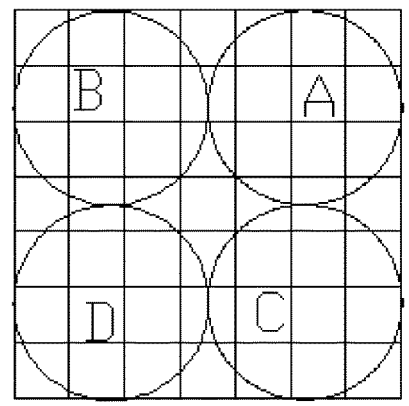
FIG. 1A          FIG. 1B
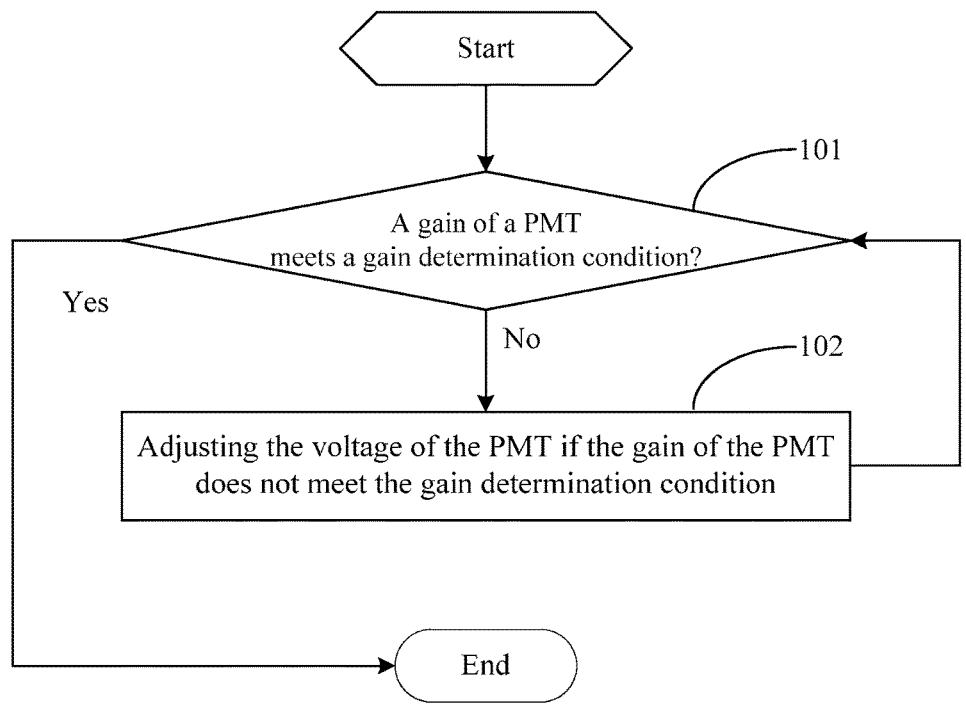
FIG. 2

US 10,006,808 B2

ADJUSTING GAIN OF DETECTOR

CROSS-REFERENCE TO RELATED APPLICATIONS

The present application claims priority to Chinese Patent Application No. 201510917816.5, filed on Dec. 11, 2015, the entire contents of which are hereby incorporated by reference for all purposes.

BACKGROUND

The present disclosure is directed to adjusting a gain of a detector.

A photomultiplier tube (PMT) detector may have a photodetector (e.g., a photomultiplier tube, PMT) and a crystal, which is widely used in a nuclear detection field and a nuclear medicine field. For example, the photomultiplier tube detector may be applied to an experimental study of astrophysics, a container inspection, a Positron Emission Computed Tomography (PET), a Single Photon Emission Computed Tomography (SPECT), and the like. The crystal may be used to detect a photon (e.g., a γ photon) released from a detected subject and convert it into a visible light. The photodetector may be used to convert the visible light into an electrical signal.

The PMT may include an incident window, a photocathode, a multiplier system (a gate and a dynode), an anode, etc. The visible light (such as, a fluorescence) produced by a crystal array may emit onto the photocathode through the incident window of the PMT, and thus a photoelectric effect may occur and electrons may be accordingly generated. The electrons may be progressively multiplied by the dynode of the photomultiplier tube, and then collected by the anode to form an electrical signal. The detector may adopt a certain number of PMTs combined with dozens of times the number of crystals (also called a crystal array) to jointly perform a position detection of a γ photon annihilation point. A light guide may be used to split lights, and a centre-of-gravity method may be used to process the electrical signal formed by the PMT in order to acquire a position information of the γ photon annihilation point, so as to reconstruct an image based on the acquired positioned information. Hereinafter, the method may be also referred to as a centre-of-gravity based imaging method. The gains of different PMTs may be different from each other due to factors like their own performances of the PMTs. Thus, for optical signals of the same energy, the electrical signals outputted through different PMTs may be of different energy, which may cause calculation errors in position information and/or time information. Therefore, a gain adjustment may be performed on the electrical signals outputted by the PMTs in order to reduce a probability of calculation errors.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

BRIEF DESCRIPTION OF DRAWINGS

The details of one or more embodiments of the subject matter described in the present disclosure are set forth in the accompanying drawings and description below. Other features, aspects, and advantages of the subject matter will become apparent from the description, the drawings, and the claims. Features of the present disclosure may be illustrated by way of example and not limited in the following figures, in which like numerals indicate like elements.

FIG. 1A and FIG. 1B are architecture diagrams of a PMT detector module according to an example of the present disclosure;

FIG. 2 is a flowchart illustrating an operating procedure of a method of adjusting a gain of a detector according to an example of the present disclosure;

DETAILED DESCRIPTION

Figure 3:
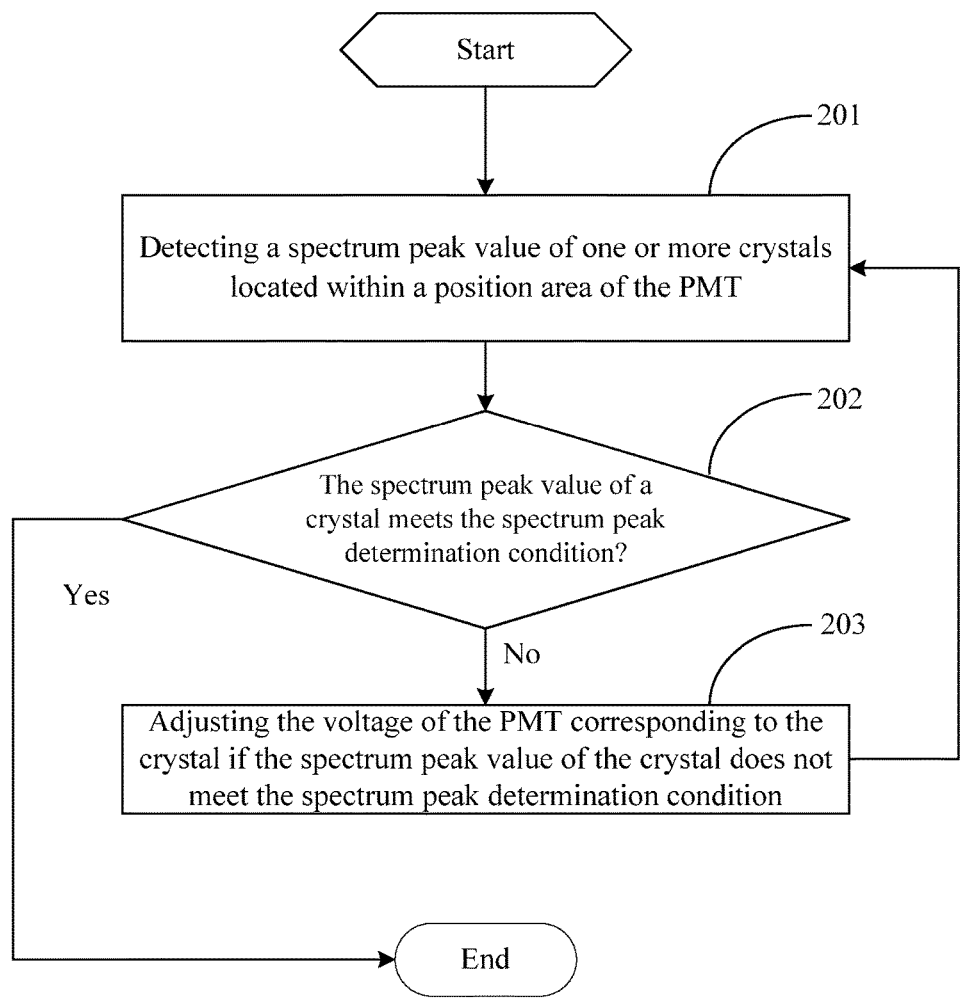
FIG. 3 is a flowchart illustrating an operating procedure of a method of adjusting a gain of a detector according to another example of the present disclosure.

The present disclosure may be applied to a detector which adopts a photomultiplier tube (PMT) to perform a centre-of-gravity based imaging method. For example, the present disclosure may be applied to a Positron Emission Computed Tomography (PET) or a Single Photon Emission Computed Tomography (SPECT) in a nuclear medicine field. The present disclosure may be applied to a nuclear detection field, such as, an experimental study of astrophysics, a container inspection, etc. The present disclosure may also be applied to other devices which adopt a PMT to perform a centre-of-gravity based imaging method, or other devices requiring consistency of photomultiplier tubes.

The architecture of a PMT detector module may be described with reference to FIG. 1A and FIG. 1B. In FIG. 1A and 1B, a detector module composed of a plurality of scintillation crystals (may also be referred to as "crystal array" hereinafter) and a plurality of (usually four) photomultiplier tubes is shown. As shown in FIG. 1B, a square may represent a scintillation crystal, a ring may represent a photomultiplier tube, and each of the photomultiplier tubes may correspond to a plurality of scintillation crystals. The photomultiplier tubes A and B may be adjacent to each other along a horizontal direction of the detector module (e.g., an X-axis direction), the photomultiplier tubes C and D may be adjacent to each other along the horizontal axis direction of the detector module, the photomultiplier tubes A and C may be adjacent to each other along a vertical axis direction of the detector module (e.g., an Y-axis direction), and the photomultiplier tubes B and D may be adjacent to each other along the vertical axis direction of the detector module.

Herein, the principle of a centre-of-gravity based imaging method for a PMT detector module may be described. Referring to FIG. 1A and FIG. 1B, when one γ photon is incident onto the PMT detector module, each of the four photomultiplier tubes A, B, C, and D may output an electrical pulse signal (e.g., a PMT signal, also referred to as an electrical signal), which may be recorded as $E_A$, $E_B$, $E_C$, and $E_D$, respectively. The centre-of-gravity based imaging method may use the electrical signals outputted by the photomultiplier tubes to determine an incident position (e.g., the coordinate values in X-axis direction and Y-axis direction) of the γ photon onto the crystal array. For example, the incident position of the γ photon may be calculated based on the following formulas.

$$E = E_A + E_B + E_C + E_D; \quad \text{Formula (1)}$$

$$X = \frac{E_A + E_B - E_C - E_D}{E}; \quad \text{Formula (2)}$$

$$Y = \frac{E_A + E_C - E_D - E_B}{E}. \quad \text{Formula (3)}$$

Based on the incident position of the γ photon, it may determine onto which crystal of the crystal array the γ photon is incident.

In general, a PMT detector may be usually composed of a plurality of above-described PMT detector modules. When a γ photon is detected by a crystal of a PMT detector module, a PMT may convert a fluorescence generated by the crystal into an electrical signal through a photoelectric effect, and then the electrical signals generated by the above-described four PMTs may be used to determine an incident position of the γ photon according to the centre-of-gravity based imaging method. Since the performances of the PMTs may be different from each other, gains of the PMTs may be different from each other. Therefore, even if light signals generated by the crystals have the same energy, electrical signals outputted by the PMTs may be of different energy, which may affect accuracy for a position detection of the centre-of-gravity based imaging method. The present disclosure may adjust the gain of each of the PMTs to ensure consistency of the electrical signals outputted by each of the PMTs, which may thus improve accuracy for a position detection of the centre-of-gravity based imaging method.

FIG. 2 illustrates an operating procedure of a method of adjusting a gain of a detector according to an example of the present disclosure. The method may include the following blocks 101-102.

At block 101, it may be determined whether a gain of a photomultiplier tube in the detector meets a gain determination condition or not. Here, the gain determination condition may indicate that an absolute value of a difference between the gain of the photomultiplier tube and a target gain is less than or equal to a first threshold. For example, the absolute value of the difference between the gain of the photomultiplier tube and the target gain may be within a first predetermined numerical range. If the absolute value of the difference between the gain of any one of the photomultiplier tubes and the target gain is greater than the first threshold (e.g., the absolute value of the difference is not within the first predetermined numerical range), the procedure may proceed to block 102.

In an example, the gain determination condition may be set in advance based on the consistency requirement of electrical signals for the PMT detector. If the consistency requirement of electrical signals is higher, the first threshold in the gain determination condition may be set to be a smaller value, such as 0. If the consistency requirement of electrical signals is lower, the first threshold in the gain determination condition may be set to be a larger value, such as 0.5. Be noted that, when setting the first threshold, imaging quality requirement for imaging equipment may be satisfied.

Here, the target gain may be a numerical range or a value.

According to an example, at block 101, the gain of each of the photomultiplier tubes may be measured according to a spectrum peak value of one or more crystals located within a position area of the photomultiplier tube, e.g., one or more crystals corresponding to the photomultiplier tube. For example, a spectrum peak value of a crystal located within a position area of the photomultiplier tube may be detected. It may be determined whether the spectrum peak value of the crystal meets a spectrum peak value determination condition, or not. The spectrum peak value determination condition may indicate that an absolute value of a difference between a spectrum peak value of the crystal and a target spectrum peak value is less than or equal to a second threshold. For example, the absolute value of the difference between the spectrum peak value of the crystal and the target spectrum peak value may be within a second predetermined numerical range. The target spectrum peak value may indicate a spectrum peak value of the crystal when the gain of the photomultiplier tube reaches the target gain.

Similar to the above-described gain determination condition, in an example, the spectrum peak value determination condition may be set in advance based on the consistency requirement of electrical signals for PMT detector module. If the consistency requirement of electrical signals is higher, the second threshold of the spectrum peak value determination condition may be set to be a smaller value, such as 0. If the consistency requirement of electrical signals is lower, the second threshold of the spectrum peak value determination condition may be set to be a larger value. Be noted that, when setting the second threshold, imaging quality requirement for imaging equipment may be satisfied.

In an example, if all the spectrum peak values corresponding to one or more crystals located within a position area of the photomultiplier tube meet the spectrum peak value determination condition, the gain of the photomultiplier tube in the detector may meet the gain determination condition. If the spectrum peak value of any one of the crystals does not meet the spectrum peak value determination condition, the gain of the photomultiplier tube may not meet the gain determination condition.

According to another example, a count rate of the photomultiplier tube may be used to determine a gain of the photomultiplier tube.

The count rate may indicate a number of signals measured at a rear end of the detector within a unit time. In general, the count rate may be not necessarily be equal to a number of rays received by the detector within a unit time, partly because the detector may have a certain detection efficiency and may not completely convert the rays into electrical signals, and partly because an intensity threshold for recording electrical signals may be set at the rear end of the detector. If the intensity of an electrical signal is too weak and does not reach the intensity threshold, the electrical signal may not be recorded, such that the actual count rate may be lower than the number of electrical signals generated by the PMT. However, there may be a linear relationship between the count rate and the conversion gain of the detector. For example, the higher the gain, the higher the count rate may be. Therefore, the count rate may be used to measure the gain of the PMT. In other words, the count rate of the PMT may be used to determine whether the gain of the PMT meets the gain determination condition.

For a detector module adopting the centre-of-gravity based imaging method, all of the four PMTs may output a corresponding electrical signal when an electrical signal is collected by the rear end of the detector. Hence, the number of electrical signals outputted by the PMT within a fixed time, and greater than the intensity threshold, may be calculated to be the count rate of the PMT. For example, the count rate may equal to the total number/total time of electrical signals greater than the intensity threshold. In practice, a fixed electrical signal collecting time T may be pre-set, and then the number of electrical signals outputted by the PMT within the collecting time T, and greater than the intensity threshold, may be recorded.

In an example, using the count rate of the photomultiplier tube to determine the gain of the photomultiplier tube may include the following steps: detecting electrical signals at an output end of the photomultiplier tube, obtaining a count rate of the photomultiplier tube by calculating a total number of electrical signals greater than the intensity threshold within a unit time, and determining whether the count rate of the photomultiplier tube meets the count rate determination condition or not. Here, the count rate determination condition may indicate that an absolute value of a difference between a count rate of the photomultiplier tube and a target count rate is less than or equal to a third threshold. For example, the absolute value of the difference between the count rate of the photomultiplier tube and the target count rate may be within a third predetermined numerical range; where the target count rate may indicate the count rate of the photomultiplier tube when the gain of the photomultiplier tube reaches the target gain.

In an example, the third threshold may be a pre-set voltage threshold, a pre-set current threshold, a pre-set energy threshold, etc.

Similar to the above-described gain determination condition, in an example, the count rate determination condition may be set in advance based on the consistency requirement of electrical signals for the PMT detector. If the consistency requirement of electrical signals is higher, the third threshold in the count rate determination condition may be set to be a smaller value, such as 0. If the consistency requirement of electrical signals is lower, the third threshold in the count rate determination condition may be set to be a larger value, such as 0.5. Be noted that, when setting the third threshold, imaging quality requirement for imaging equipment may be satisfied.

In an example, if the count rate of the photomultiplier tube meets the count rate determination condition, the gain of the photomultiplier tube may meet the gain determination condition. If the count rate of the photomultiplier tube does not meet the count rate determination condition, the gain of the photomultiplier tube may not meet the gain determination condition.

At block 102, the gain of the photomultiplier tube may be adjusted by adjusting a voltage of the photomultiplier if the gain of the photomultiplier tube does not meet the gain determination condition.

For example, one or more dynode voltages of the photomultiplier tube may be adjusted in order to adjust the gain of the photomultiplier tube.

In an example, an overall voltage of the photomultiplier tube may be adjusted in order to adjust the gain of the photomultiplier tube.

In another example, the PMT's circuit configuration may be combined together for adjusting the gain of the photomultiplier tube.

For example, a resistance of a variable resistor in a voltage divider circuit of the photomultiplier tube may be adjusted in order to adjust the gain of the photomultiplier tube. In another example, the above-described voltage adjustment and resistance adjustment may be combined to achieve the gain adjustment.

A digital potentiometer may be one kind of programmable variable resistor. In another example of the present disclosure, a digital potentiometer may be used to adjust the gain of the photomultiplier tube. When a digital potentiometer is disposed in the voltage divider circuit of the photomultiplier tube, the resistance of the digital potentiometer may be adjusted for adjusting the voltage of the photomultiplier tube. Specifically, a bus data download method may be adopted for adjusting the resistance of the digital potentiometer in order to adjust the gain of the photomultiplier tube. After adjusting the resistance of the digital potentiometer, if the gain of the photomultiplier tube meets the gain determination condition, the resistance of the digital potentiometer may be latched to ensure that the resistance of the digital potentiometer is not lost for subsequent recycling and reuse.

In another example, a withstand voltage of the variable resistor of the digital potentiometer may be not very high, e.g., below 500 volts. In one example, one or more dynode voltages of the photomultiplier tube may be adjusted in order to disperse the voltage loading of the single variable resistor, thereby extending the life of a device. Be noted that, if the dynode voltage adjustment method is adopted, the variable resistor may be connected in parallel with the dynode of the photomultiplier tube in order to facilitate adjustment of the dynode voltage.

In another example, a signal amplifier may be disposed at the rear end of each of the photomultiplier tubes for adjusting the gain of each of the photomultiplier tubes in the detector, such that electrical signals outputted by all of the photomultiplier tubes may be normalized. This method may need to increase electronic components like OP amplifiers, which may result in a higher cost of the detector.

Since most of the photomultiplier tubes are finished components, when in use, high-voltage divider circuits may be completed by circuit designers based on product descriptions in order to ensure normal operation of each of the photomultiplier tubes. This may result in that those skilled in the art may view the photomultiplier tube and a high-voltage divider circuit as a whole, and be not concerned about their inner workings. In the event of inconsistency existed between the gains of electrical signals of each of the photomultiplier tubes, those skilled in the art may try to make improvements at the rear end of the photomultiplier tube.

However, the present disclosure may provide a mechanism to make improvements at the front end of the photomultiplier tube (e.g., before a signal is outputted by the photomultiplier tube). The present disclosure may determine an inconsistent gain situation in advance, and make gains of all of the photomultiplier tubes consistent by adjusting the voltage of the photomultiplier tube. No extra electronic components like OP amplifiers may be required in the present disclosure, which may simplify the complexity of implementation, reduce costs, and avoid loss of electrical signals caused by OP amplifiers.

The following may describe a gain adjustment table involved in measuring the gain of the photomultiplier tube based on the spectrum peak value.

The gain adjustment table may be pre-established by using experimental data, and may include a relationship of a difference, or an absolute value of the difference, between a crystal spectrum peak value and a target spectrum peak value, the target spectrum peak value, and a resistance of a variable resistor. For example, a stepped resistance adjustment method may be used to collect resistor data, the crystal spectrum peak value, and so on, for analysing mobility of the crystal spectrum peak value, and to record the relationship between the resistance of the variable resistor, the absolute value of the difference between the crystal spectrum peak value and the target spectrum peak value, and the target spectrum peak value. The target spectrum peak value may indicate a spectrum peak value of the crystal when the gain of the photomultiplier tube reaches the target gain, which may be determined through experiments based on the spectrum peak value of input signals of the crystal and the actual gain performance of the photomultiplier tube in the detector.

For example, if the gain of the photomultiplier tube does not meet the gain determination condition, an absolute value of a difference between a spectrum peak value of one or more crystals located within a position area of the photomultiplier tube and the target spectrum peak value, may be determined. A resistance of a variable resistor corresponding to the absolute value of the difference and the target spectrum peak value may then be searched in the pre-established gain adjustment table. A resistance of a variable resistor of a voltage divider circuit in the photomultiplier tube may be adjusted according to the searched resistance of the variable resistor.

The above-described implementation may be performed based on the pre-established gain adjustment table, and the photomultiplier tube may adjust its voltage according to the actual gain of the photomultiplier tube, such that gains of all the photomultiplier tubes in the detector may satisfy a gain consistency requirement.

In the following, another example may be used to explain a technical scheme of the present disclosure.

FIG. 3 illustrates an operating procedure of a method of adjusting a gain of a detector according to another example of the present disclosure. The method may include the following blocks 201-203.

At block 201, a spectrum peak value of one or more crystals located within a position area of the photomultiplier tube may be detected.

For a detector, a position area of the photomultiplier tube may be connected to one or more crystals. For example, the photomultiplier tube may be coupled with a plurality of crystals for connecting with each other. In this example, the spectrum peak value of one crystal may be only detected, or the spectrum peak values of a plurality of crystals may be detected, and used to jointly measure the gain of the photomultiplier tube.

At block 202, whether the spectrum peak value of a crystal meets the spectrum peak value determination condition may be determined, where the spectrum peak value determination condition may indicate that an absolute value of a difference between a spectrum peak value of the crystal and a target spectrum peak value is less than or equal to a second threshold. When determining that the spectrum peak value of any one of the crystals does not meet the spectrum peak value determination condition, the procedure may proceed to block 203.

At block 201, if the spectrum peak values of a plurality of crystals within a position area of the photomultiplier tube are detected, the following operations may be adopted in block 202.

First, a mean value of spectrum peak values of the plurality of crystals detected by the photomultiplier tube may be calculated, and then, whether the mean value of spectrum peak values of the plurality of crystals meets the spectrum peak value determination condition, may be determined. If an absolute value of a difference between the mean value of spectrum peak values of the plurality of crystals and a target spectrum peak value is beyond the second predetermined numerical range, the gain of the photomultiplier tube may not meet the gain determination condition. It may be understood that the target spectrum peak value may indicate a spectrum peak value of a crystal when the gain of the photomultiplier tube reaches the target gain.

In an example, the mean value of spectrum peak values of the plurality of crystals located within a position area of the photomultiplier tube may be used to measure the gain of the photomultiplier tube. When adopting the mean value determination, the plurality of crystals closer to a detection position may be selected in order to ensure a higher reliability of the mean value.

Second, it may be determined whether a spectrum peak value of a crystal detected by the photomultiplier tube meets the spectrum peak value determination condition or not. If the spectrum peak value of any one of the crystals corresponding to the photomultiplier tube does not meet the spectrum peak value determination condition, the gain of the photomultiplier tube may not meet the gain determination condition, and thus the gain of the photomultiplier tube may be adjusted.

When the spectrum peak value of any one of the crystals meets the spectrum peak value determination condition, after a fluorescence signal generated by the crystal passes through all the PMTs, a plurality of obtained electrical signals may be consistent (e.g., of same energy), and thus subsequent normalization may substantially not be needed.

When the spectrum peak value of any one of the crystals does not meet the spectrum peak value determination condition, after a fluorescence signal generated by the crystal passes through all the PMTs, a plurality of obtained electrical signals may be inconsistent (e.g., of different energy). In this case, the voltage of the PMT may be adjusted in order to ensure that the electrical signals outputted by each of the photomultiplier tubes in the detector are consistent.

Accordingly, at block 203, the voltage of the photomultiplier tube may be adjusted, such that the gains of all of the photomultiplier tubes may meet the gain determination condition.

The gain determination condition may be described in the examples above, and further description is omitted herein.

At block 203, the following implementations may be adopted.

First, an overall voltage of the photomultiplier tube may be adjusted, for example.

Second, a dynode voltage of the photomultiplier tube may be adjusted, for example.

Here, the dynode of the photomultiplier tube may be used to progressively amplify electrons. For example, a multiplication factor of the dynode may be changed if the dynode voltage is changed, thereby changing the gain of the photomultiplier tube.

In the following, the architecture of a PMT high-voltage divider circuit may be used to further explain block 203.

The PMT may need a power supply with 1-2KV to provide a positive or negative high voltage. Since the PMT has a larger gain, a small variation of the voltage may cause a highly sensitive effect on its gain. Within a certain range of the gain, the variation of the gain of the PMT may be proportional to the variation of the voltage. In the present disclosure, the gain of the PMT may be adjusted by changing the voltage of the PMT based on the above-described physical characteristics of PMT.

The following methods may be combined with the architecture of the PMT high-voltage divider circuit to adjust the gain of the photomultiplier tube.

In one example, a resistance of a variable resistor of the photomultiplier tube may be adjusted in order to adjust the voltage of the photomultiplier tube, such that the gain of the photomultiplier tube may meet the gain determination condition. The variable resistor may be located in a voltage divider circuit of the photomultiplier tube, for example, the voltage divider circuit(s) illustrated in FIG. 4 and FIG. 5.

Figure 4:
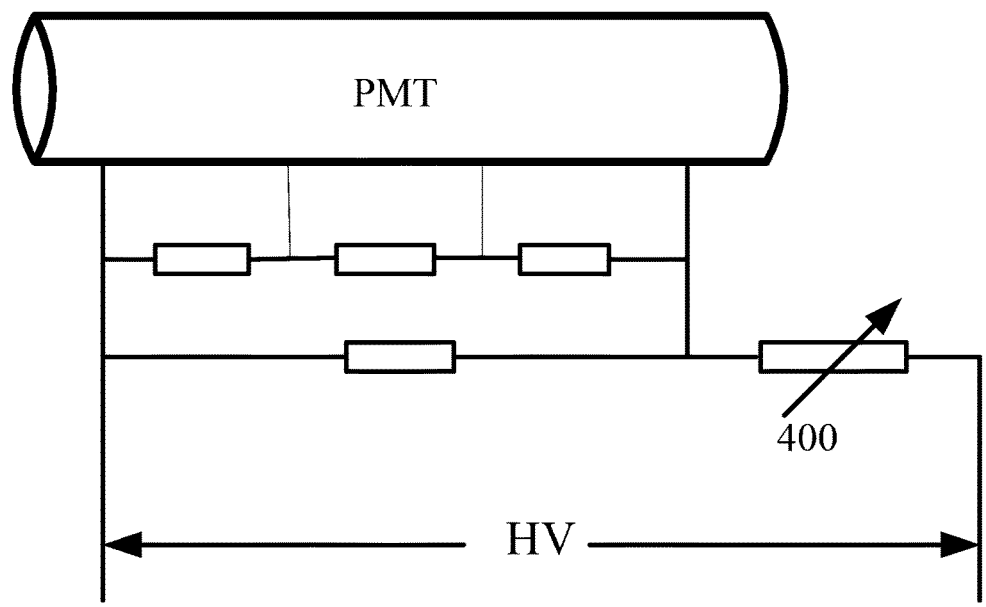
FIG. 4 is an architecture diagram of a PMT voltage divider circuit according to an example of the present disclosure.

FIG. 4 is an architecture diagram of a PMT voltage divider circuit according to an example of the present disclosure. In FIG. 4, a variable resistor 400 in the PMT voltage divider circuit may be used to adjust the overall voltage of the photomultiplier tube.

Figure 5:
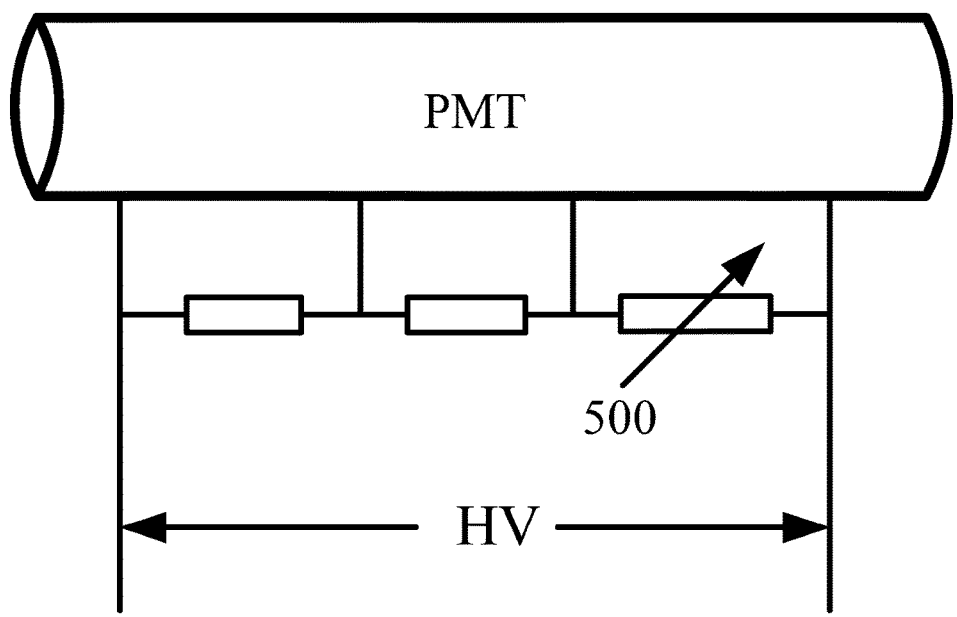
FIG. 5 is an architecture diagram of a PMT voltage divider circuit according to another example of the present disclosure.

FIG. 5 is an architecture diagram of a PMT voltage divider circuit according to another example of the present disclosure. In FIG. 5, a variable resistor 500 in the PMT voltage divider circuit may be used to adjust a dynode voltage of the photomultiplier tube.

Be noted that, a number of non-variable resistors shown in FIG. 4 and FIG. 5 may be merely exemplary examples. In a specific example, a number of resistors and their connections may be determined according to a specific circuit architecture requirement of the PMT. A number of variable resistors shown in FIG. 4 and FIG. 5 may be merely exemplary examples. In a specific example, a plurality of variable resistors may be adopted, for example, at least one variable resistor may be set for each dynode.

In practice, some elements of the detector may be susceptible to temperature, humidity, and other factors when running, which may lead to a large variation in physical properties, and may result in the detector not maintaining a stable performance. Based on this, as shown in FIG. 3, after the gain adjustment according to block 203, the procedure may return to block 201, until the spectrum peak value of any one of the crystals meets the spectrum peak value determination condition.

Figure 6A:
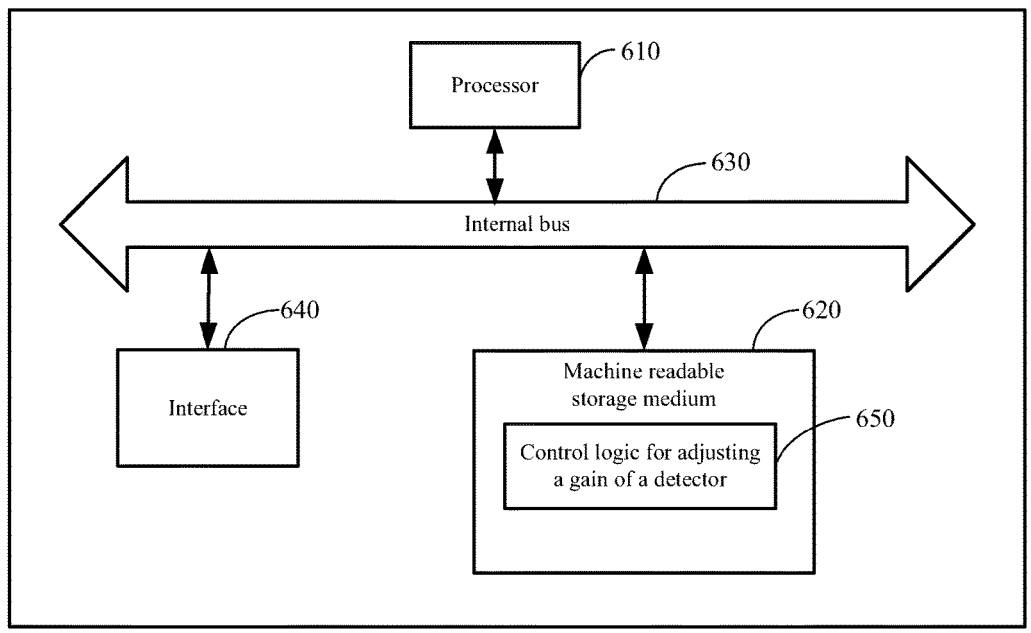
FIG. 6A is a hardware architecture diagram of a device of adjusting a gain of a detector according to an example of the present disclosure.

In accordance with the above-described method of adjusting a gain of a detector provided in the above examples, a device of adjusting a gain of a detector may be provided in an example of the present disclosure. FIG. 6A is a hardware architecture diagram of a gain adjustment device of a detector according to an example of the present disclosure. As shown in FIG. 6A, the gain adjustment device of the detector may include a processor 610 and a machine readable storage medium 620, where the processor 610 may be connected to the machine readable storage medium 620 through an internal bus 630. In other possible implementations, the gain adjustment device may further include an external interface 640 for communicating with other devices or components.

In some examples, the machine readable storage medium 620 may be Radom Access Memory (RAM), volatile memory, non-volatile memory, flash memory, storage drives (such as, a hard drive), solid state drive, any type of storage disks (such as, CD-ROM, DVD, etc.), or similar storage medium, or a combination thereof.

Figure 6B:
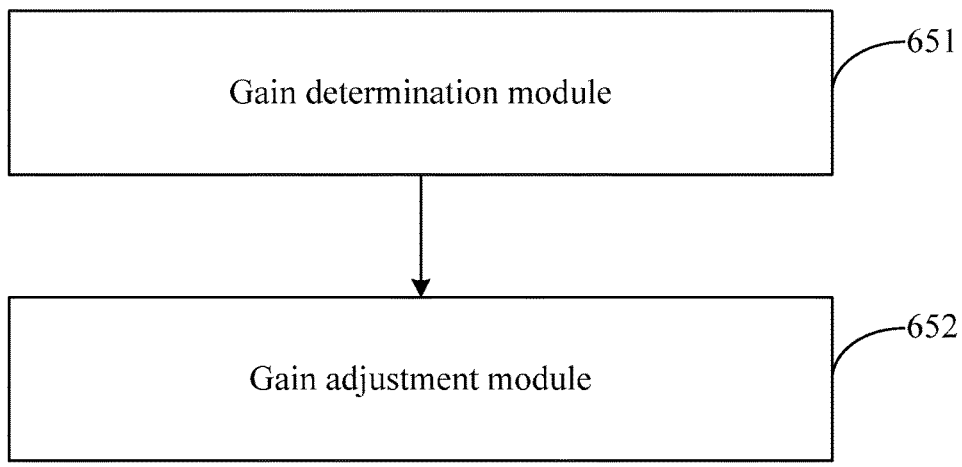
FIG. 6B is a block diagram of a control logic for adjusting a gain of a detector according to an example of the present disclosure.

In an example, the machine readable storage medium 620 may be used to store machine readable instructions corresponding to a control logic 650 for adjusting a gain of the detector. FIG. 6B is a block diagram of a control logic for adjusting a gain of a detector according to an example of the present disclosure. As shown in FIG. 6B, the control logic 650 may include a gain determination module 651 and a gain adjustment module 652.

The gain determination module 651 may be used to determine whether a gain of the photomultiplier tube in the detector meets a gain determination condition or not, where the gain determination condition indicates that an absolute value of a difference between the gain of the photomultiplier tube and a target gain is within a first predetermined numerical range.

The gain adjustment module 652 may be used to adjust a voltage of the photomultiplier tube when the gain determination module 651 determines that the gain of the photomultiplier tube does not meet the gain determination condition, such that the gain of the photomultiplier tube may meet the gain determination condition.

According to an example, the gain determination module 651 may include a spectrum peak value detection sub-module and a spectrum peak value determination sub-module.

The spectrum peak value detection sub-module may be used to detect a spectrum peak value of one or more crystals located within a position area of the photomultiplier tube.

The spectrum peak value determination sub-module may be used to determine whether a spectrum peak value of a crystal meets the spectrum peak value determination condition or not. The spectrum peak value determination condition may indicate that an absolute value of a difference between the spectrum peak value of the crystal and a target spectrum peak value may be within a second predetermined numerical range; and the target spectrum peak value may indicate a spectrum peak value of the crystal when the gain of the photomultiplier tube reaches the target gain.

According to another example, the gain determination module 651 may include a count rate detection sub-module and a count rate determination sub-module.

The count rate detection sub-module may be used to obtain a count rate of the photomultiplier tube by calculating a number of electrical signals which are outputted from an output end of the photomultiplier tube and have an intensity greater than a predetermined threshold within a unit time.

The count rate determination sub-module may be used to determine whether the count rates of the photomultiplier tube meet a count rate determination condition. The count rate determination condition may indicate that an absolute value of a difference between the count rate of the photomultiplier tube and a target count rate is within a third predetermined numerical range; and the target count rate may indicate a count rate of the photomultiplier tube when the gain of the photomultiplier tube reaches the target gain.

According to one example, the gain adjustment module 652 may include a dynode voltage adjustment sub-module or an overall voltage adjustment sub-module.

The dynode voltage adjustment sub-module may be used to adjust one or more dynode voltages of the photomultiplier tube.

The overall voltage adjustment sub-module may be used to adjust an overall voltage of the photomultiplier tube.

According to another example, the gain adjustment module 652 may adjust a resistance of a variable resistor in a voltage divider circuit of the photomultiplier tube, thereby adjusting the gain of the photomultiplier tube.

According to still another example, the gain adjustment module 652 may include a difference calculation sub-module, a resistance of a variable resistor search sub-module, and a resistance adjustment sub-module.

The difference calculation sub-module may be used to calculate an absolute value of a difference between a spectrum peak value of one or more crystals located within a position area of the photomultiplier tube and a target spectrum peak value. The gain of the photomultiplier tube may not meet the gain determination condition.

The resistance of a variable resistor search sub-module may be used to search a resistance of a variable resistor corresponding to the absolute value of the difference and the target spectrum peak value in a pre-established gain adjustment table, where the pre-established gain adjustment table comprises a relationship of an absolute value of a difference between a crystal spectrum peak value and a target spectrum peak value, the target spectrum peak value, and a resistance of a variable resistor.

The resistance adjustment sub-module may be used to adjust a variable resistor in a voltage divider circuit of the photomultiplier tube according to the searched resistance of the variable resistor.

Here the variable resistor may comprise a digital potentiometer.

The gain adjustment device of the detector of the present disclosure may be applied in any electronic device equipped with at least one processor that may control a PMT detector. The electronic device may be any existing, under development, or future electronic device, which may include but is not limited to, any existing, under development, or future desktop computer, laptop computer, mobile terminal (including smartphones, feature phones, a variety of tablet PCs) and the like. An example of the device may be implemented by software, hardware, or a combination thereof. In an example, the device may be implemented in a form of a computer software product. As a device in logical sense, it may be formed by using a processor of an electronic device equipped with at least one processor to access corresponding machine readable instructions stored in a storage medium to be run in a memory.

An example below may be implemented with software, which may describe how the gain adjustment device of the detector runs the control logic 650. In this example, the control logic 650 of the present disclosure may be understood as machine readable instructions stored in the machine readable storage medium 620. When the processor 610 of the gain adjustment device executes the control logic 650, the processor 610 may execute corresponding machine readable instructions of the control logic 650 stored in the machine readable storage medium 620 to: determine whether a gain of a photomultiplier tube in the detector meets a gain determination condition, where the gain determination condition may indicate that an absolute value of a difference between the gain of the photomultiplier tube and a target gain is within a first predetermined numerical range; and adjust a voltage of the photomultiplier tube if the gain of the photomultiplier tube does not meet the gain determination condition.

According to an example, when determining whether a gain of a photomultiplier tube in the detector meets a gain determination condition, said machine readable instructions further cause the processor to: detect a spectrum peak value of one or more crystals located within a position area of the photomultiplier tube; and determine that the gain of the photomultiplier tube does not meet the gain determination condition if an absolute value of a difference between the spectrum peak value of a crystal and a target spectrum peak value is beyond a second predetermined numerical range, where the target spectrum peak value may indicate a spectrum peak value of the crystal in a case that the gain of the photomultiplier tube reaches the target gain.

According to another example, when determining whether a gain of a photomultiplier tube in the detector meets a gain determination condition, said machine readable instructions further cause the processor to: detect a spectrum peak value of one or more crystals located within a position area of the photomultiplier tube; and determine that the gain of the photomultiplier tube does not meet the gain determination condition if an absolute value of a difference between a mean value of spectrum peak values of the crystals and a target spectrum peak value is beyond the second predetermined numerical range, where the target spectrum peak value may indicate a spectrum peak value of a crystal when the gain of the photomultiplier tube reaches the target gain.

According to still another example, when determining whether a gain of a photomultiplier tube in the detector meets a gain determination condition, said machine readable instructions further cause the processor to: obtain a count rate of the photomultiplier tube by calculating a number of electrical signals which are outputted from an output end of the photomultiplier tube and have an intensity greater than a predetermined threshold within a unit time; and determine that the gain of the photomultiplier tube does not meet the gain determination condition if an absolute value of a difference between the count rate of the photomultiplier tube and a target count rate is beyond a third predetermined numerical range, where the target count rate may indicate a count rate of the photomultiplier tube when the gain of the photomultiplier tube reaches the target gain.

According to an example, when adjusting a voltage of the photomultiplier tube, said machine readable instructions further cause the processor to: adjust one or more dynode voltages of the photomultiplier tube.

According to another example, when adjusting a voltage of the photomultiplier tube, said machine readable instructions further cause the processor to: adjust an overall voltage of the photomultiplier tube.

According to still another example, when adjusting a voltage of the photomultiplier tube, said machine readable instructions further cause the processor to: adjust a resistance of a variable resistor in a voltage divider circuit of the photomultiplier tube. The variable resistor may comprise a digital potentiometer.

In another example, when adjusting a resistance of a variable resistor in a voltage divider circuit of the photomultiplier tube, said machine readable instructions further cause the processor to: calculate an absolute value of a difference between a spectrum peak value of one or more crystals located within a position area of the photomultiplier tube and a target spectrum peak value; search a resistance of a variable resistor corresponding to the absolute value of the difference and the target spectrum peak value in a pre-established gain adjustment table; and adjust a variable resistor in a voltage divider circuit of the photomultiplier tube according to the searched resistance of the variable resistor.

Figure 7:
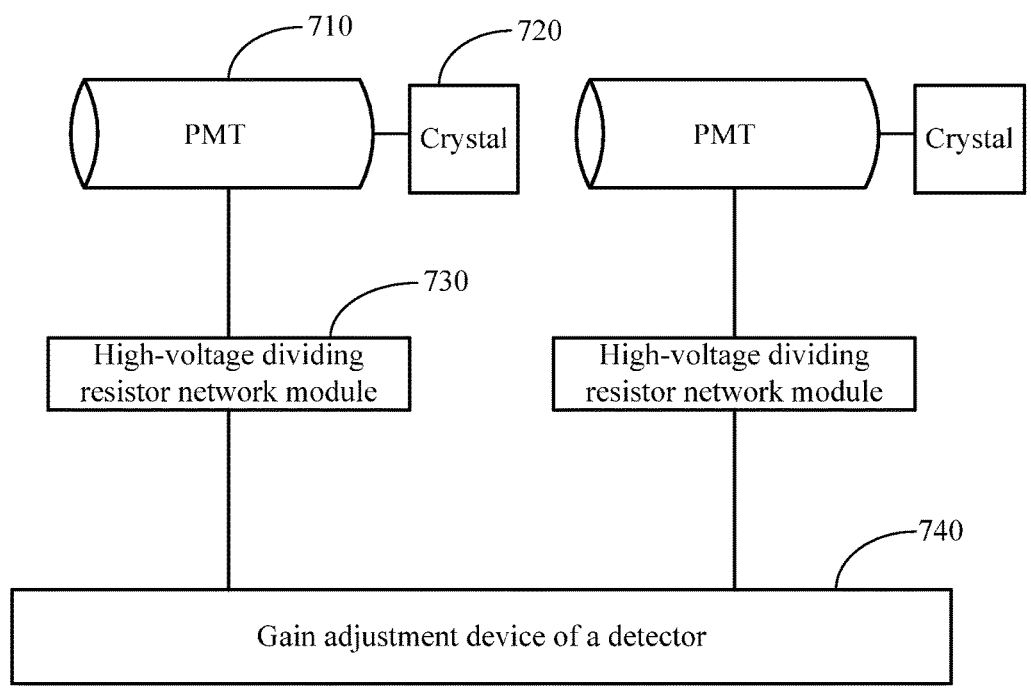
FIG. 7 is a hardware architecture diagram of a detector according to an example of the present disclosure.

In another example, a detector with at least two photomultiplier tubes may be provided in the present disclosure. FIG. 7 is a hardware architecture diagram of a detector according to an example of the present disclosure. In order to facilitate understanding of those skilled in the art, only two photomultiplier tubes 710 are shown in FIG. 7, where the structure of each of the photomultiplier tubes 710 connected to a crystal 720 may be taken as an example. As shown in FIG. 7, the photomultiplier tube detector may include:

at least two photomultiplier tubes 710, where each of the photomultiplier tubes may be connected to at least one crystal 720. Each of the photomultiplier tubes 710 may be equipped with a high-voltage dividing resistor network module 730, and the high-voltage dividing resistor network module 730 may be used to distribute a high voltage of each of the photomultiplier tubes 710 to each dynode; and a gain adjustment device 740 of a detector as described above.

According to an example, the high-voltage dividing resistor network module 730 may include at least one variable resistor, where the variable resistor may comprise a digital potentiometer.

According to an example, each of the photomultiplier tubes 710 may be coupled to at least one crystal 720.

For convenience and brevity of description, those skilled in the art shall clearly understand that, specific work process of the above-described systems, devices, and units may refer to the corresponding procedures of aforementioned method examples, and further description may be omitted herein.

The above are only preferred examples of the present disclosure is not intended to limit the disclosure within the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of adjusting a gain of a detector, comprising:
    determining whether a gain of a photomultiplier tube in the detector meets a gain determination condition or not, wherein the gain determination condition indicates that an absolute value of a difference between the gain of the photomultiplier tube and a target gain is within a first predetermined numerical range; and
    when the gain of the photomultiplier tube does not meet the gain determination condition, adjusting a resistance of a variable resistor in a voltage divider circuit of the photomultiplier tube, wherein adjusting the resistance of the variable resistor in the voltage divider circuit of the photomultiplier tube comprises:
        calculating an absolute value of a difference between a spectrum peak value of one or more crystals located within a position area of the photomultiplier tube and a target spectrum peak value, wherein the target spectrum peak value indicates a spectrum peak value of the one or more crystals when the gain of the photomultiplier tube reaches the target gain;
        searching a resistance of a variable resistor corresponding to the absolute value of the difference and the target spectrum peak value in a pre-established gain adjustment table, wherein the pre-established gain adjustment table comprises a relationship of an absolute value of a difference between a crystal spectrum peak value and the target spectrum peak value, the target spectrum peak value, and the resistance of the variable resistor; and
        adjusting the variable resistor in the voltage divider circuit of the photomultiplier tube according to the searched resistance of the variable resistor.

2. The method of claim 1, wherein said determining whether the gain of the photomultiplier tube in the detector meets the gain determination condition comprises:
    detecting a spectrum peak value of each of the one or more crystals located within the position area of the photomultiplier tube; and
    determining that the gain of the photomultiplier tube does not meet the gain determination condition if an absolute value of a difference between any one of the detected spectrum peak values and the target spectrum peak value is beyond a second predetermined numerical range.

3. The method of claim 1, wherein said determining whether the gain of the photomultiplier tube in the detector meets the gain determination condition comprises:
 detecting a spectrum peak value of each of the one or more crystals located within the position area of the photomultiplier tube; and
 determining that the gain of the photomultiplier tube does not meet the gain determination condition if an absolute value of a difference between a mean value of the detected spectrum peak values and the target spectrum peak value is beyond a second predetermined numerical range.

4. The method of claim 1, wherein said determining whether the gain of the photomultiplier tube in the detector meets the gain determination condition comprises:
 obtaining a count rate of the photomultiplier tube by calculating a number of electrical signals which are outputted from an output end of the photomultiplier tube and have an intensity greater than a predetermined threshold within a unit time; and
 determining that the gain of the photomultiplier tube does not meet the gain determination condition if an absolute value of a difference between the count rate of the photomultiplier tube and a target count rate is beyond a third predetermined numerical range, wherein the target count rate indicates a count rate of the photomultiplier tube when the gain of the photomultiplier tube reaches the target gain.

5. The method of claim 1, wherein when the gain of the photomultiplier tube does not meet the gain determination condition, the method further comprises:
 adjusting one or more dynode voltages of the photomultiplier tube.

6. The method of claim 1, wherein when the gain of the photomultiplier tube does not meet the gain determination condition, the method further comprises:
 adjusting an overall voltage of the photomultiplier tube.

7. The method of claim 1, wherein the variable resistor comprises a digital potentiometer.

8. A device for adjusting a gain of a detector, comprising:
 a processor which invokes machine readable instructions corresponding to a control logic for adjusting a gain of a detector stored on a storage medium and executes the machine readable instructions to:
  determine whether a gain of a photomultiplier tube in the detector meets a gain determination condition or not, wherein the gain determination condition indicates that an absolute value of a difference between the gain of the photomultiplier tube and a target gain is within a first predetermined numerical range; and
  when the gain of the photomultiplier tube does not meet the gain determination condition, adjust a resistance of a variable resistor in a voltage divider circuit of the photomultiplier tube, wherein when adjusting the resistance of the variable resistor in the voltage divider circuit of the photomultiplier tube, said machine readable instructions cause the processor to:
  calculate an absolute value of a difference between a spectrum peak value of one or more crystals located within a position area of the photomultiplier tube and a target spectrum peak value, wherein the target spectrum peak value indicates a spectrum peak value of the one or more crystals when the gain of the photomultiplier tube reaches the target gain;
  search a resistance of a variable resistor corresponding to the absolute value of the difference and the target spectrum peak value in a pre-established gain adjustment table, wherein the pre-established gain adjustment table comprises a relationship of an absolute value of a difference between a crystal spectrum peak value and the target spectrum peak value, the target spectrum peak value, and the resistance of the variable resistor; and
  adjust the variable resistor in the voltage divider circuit of the photomultiplier tube according to the searched resistance of the variable resistor.

9. The device of claim 8, wherein when determining whether the gain of the photomultiplier tube in the detector meets the gain determination condition, said machine readable instructions further cause the processor to:
 detect a spectrum peak value of each of the one or more crystals located within the position area of the photomultiplier tube; and
 determine that the gain of the photomultiplier tube does not meet the gain determination condition if an absolute value of a difference between any one of the detected spectrum peak values and the target spectrum peak value is beyond a second predetermined numerical range.

10. The device of claim 8, wherein when determining whether the gain of the photomultiplier tube in the detector meets the gain determination condition, said machine readable instructions further cause the processor to:
 detect a spectrum peak value of each of the one or more crystals located within the position area of the photomultiplier tube; and
 determine that the gain of the photomultiplier tube does not meet the gain determination condition if an absolute value of a difference between a mean value of the detected spectrum peak values and the target spectrum peak value is beyond a second predetermined numerical range.

11. The device of claim 8, wherein when determining whether the gain of the photomultiplier tube in the detector meets the gain determination condition, said machine readable instructions further cause the processor to:
 obtain a count rate of the photomultiplier tube by calculating a number of electrical signals which are outputted from an output end of the photomultiplier tube and have an intensity greater than a predetermined threshold within a unit time; and
 determine that the gain of the photomultiplier tube does not meet the gain determination condition if an absolute value of a difference between the count rate of the photomultiplier tube and a target count rate is beyond a third predetermined numerical range, wherein the target count rate indicates a count rate of the photomultiplier tube when the gain of the photomultiplier tube reaches the target gain.

12. The device of claim 8, wherein when the gain of the photomultiplier tube does not meet the gain determination condition, said machine readable instructions further cause the processor to:
 adjust one or more dynode voltages of the photomultiplier tube.

13. The device of claim 8, wherein when the gain of the photomultiplier tube does not meet the gain determination condition, said machine readable instructions further cause the processor to:
 adjust an overall voltage of the photomultiplier tube.

14. The device of claim 8, wherein the variable resistor comprises a digital potentiometer.

15. A detector, comprising:
 at least two photomultiplier tubes, wherein each of the photomultiplier tubes is connected to at least one crystal, each of the photomultiplier tubes is equipped with a high-voltage dividing resistor network module, and the high-voltage dividing resistor network module is used to distribute a high voltage of the photomultiplier tube to a dynode;

wherein the detector is connected to each of the photomultiplier tubes according to a gain adjustment device comprising:

a processor which invokes machine readable instructions corresponding to a control logic for adjusting a gain of the detector stored on a storage medium and executes the machine readable instructions to:

determine whether a gain of a photomultiplier tube in the detector meets a gain determination condition or not, wherein the gain determination condition indicates that an absolute value of a difference between the gain of the photomultiplier tube and a target gain is within a first predetermined numerical range; and when the gain of the photomultiplier tube does not meet the gain determination condition, adjust a resistance of a variable resistor in a voltage divider circuit of the photomultiplier tube, wherein when adjusting the resistance of the variable resistor in the voltage divider circuit of the photomultiplier tube, said machine readable instructions cause the processor to:

calculate an absolute value of a difference between a spectrum peak value of one or more crystals located within a position area of the photomultiplier tube and a target spectrum peak value, wherein the target spectrum peak value indicates a spectrum peak value of the one or more crystals when the gain of the photomultiplier tube reaches the target gain;

search a resistance of a variable resistor corresponding to the absolute value of the difference and the target spectrum peak value in a pre-established gain adjustment table, wherein the pre-established gain adjustment table comprises a relationship of an absolute value of a difference between a crystal spectrum peak value and the target spectrum peak value, the target spectrum peak value, and the resistance of the variable resistor; and adjust the variable resistor in the voltage divider circuit of the photomultiplier tube according to the searched resistance of the variable resistor.

* * * * *